(12) United States Patent
Komiya

(10) Patent No.: US 8,707,670 B2
(45) Date of Patent: Apr. 29, 2014

(54) CABLE PROTECTION AND GUIDE DEVICE

(71) Applicant: Tsubakimoto Chain Co., Osaka (JP)

(72) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/765,608

(22) Filed: Feb. 12, 2013

(65) Prior Publication Data

US 2013/0212998 A1 Aug. 22, 2013

(30) Foreign Application Priority Data

Feb. 21, 2012 (JP) .................................. 2012-035577

(51) Int. Cl.
*F16G 13/00* (2006.01)

(52) U.S. Cl.
USPC .................... 59/78.1; 59/900; 248/49; 248/51

(58) Field of Classification Search
USPC ................. 59/78.1, 900; 248/49, 51
See application file for complete search history.

(56) References Cited

U.S. PATENT DOCUMENTS

| 7,392,650 B2 * | 7/2008 | Utaki et al. ............ 59/78.1 |
| 8,505,272 B1 * | 8/2013 | Komiya ................ 59/78.1 |

| 2003/0182924 A1 | 10/2003 | Tsutsumi et al. |
| 2007/0068694 A1 | 3/2007 | Utaki |
| 2007/0218829 A1 | 9/2007 | Utaki et al. |

FOREIGN PATENT DOCUMENTS

| JP | 6-65652 | 9/1994 |
| JP | 2011127716 | 6/2011 |

OTHER PUBLICATIONS

Japan Patent Office, Office Action, Oct. 15, 2013, Application No. 2012-035577, pp. 1-2, Japan.

* cited by examiner

*Primary Examiner* — David B Jones
(74) *Attorney, Agent, or Firm* — Woodling, Krost and Rust

(57) ABSTRACT

A cable protection and guide device is capable of preventing noise and abrasion powder generated by a flexion outer circumferential connecting arm and avoiding disconnection of the arm. The device includes: a number of link frame bodies each having link side plates each having a front side plate portion connected longitudinally to a preceding link side plate to form a cable flexion inner circumferential side; a rear side plate portion connected longitudinally to a succeeding link side plate to form a cable flexion outer circumferential side; and, a flexible linkage portion interposed between the front and rear side plate portions. The link frame body also includes a flexion outer circumferential-side connecting arm whose flexion outer circumferential-side surface is provided so as to be closer to the cable flexion inner circumferential side than a flexion outer circumferential edge of the rear side plate portion.

4 Claims, 15 Drawing Sheets

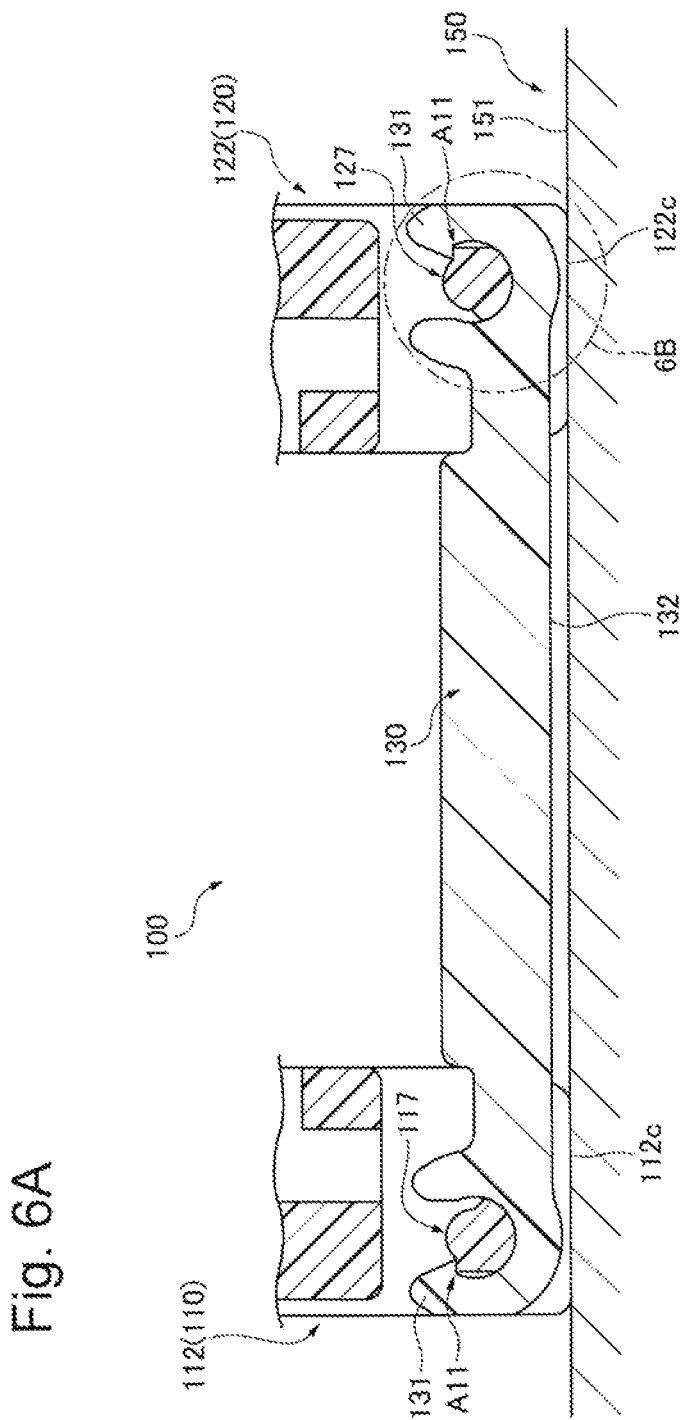

US 8,707,670 B2

CABLE PROTECTION AND GUIDE DEVICE

This patent application claims priority to Japanese Patent Application 2012-035577 filed on Feb. 21, 2012. Japanese Patent Application 2012-035577 filed on Feb. 21, 2012 is incorporated in its entirety by reference hereto.

BACKGROUND OF THE INVENTION

1. Field of the Invention

The present invention relates to a cable protection and guide device which securely protects and guides a flexible cable, such as an electric cable for transmitting electric signals or supplying electricity or a hose for supplying oil or air pressure, that connects a movable portion and a fixed portion in an industrial machine or a vehicle.

2. Description of Related Art

In the prior art, there is known a cable protection and guide device having a number of link frame bodies connected to each other in a longitudinal direction of a cable (referred to as "a cable longitudinal direction" or "longitudinally" hereinafter). Each of the link frame bodies has a pair of link side plates provided so as to be spaced from each other in a lateral direction, and connecting arms bridging over both sides (referred to as "cable flexion outer and inner circumferential sides" hereinafter) of the pair of link side plates connected flexibly in the cable longitudinal direction. The device accommodates and guides a cable at the interior of the link frame bodies from one to the other of a cable fixed end and a cable movable end, and is capable of taking a linear position in which the device is in contact with a support surface of a support, and a flexional position in which the device is spaced from the support surface as disclosed in Japanese Patent Application Laid-Open Nos. 2007-92939 and 2007-247716 for example.

FIGS. 11A and 11B show an exemplary prior art cable protection and guide device 500.

Specifically, FIG. 11A is a cross-sectional view of link frame bodies of the cable protection and guide device 500 of the prior art as seen in an inside-to-outside direction thereof, and FIG. 11B is an enlarged cross-sectional view of a portion marked as 11B in FIG. 11A.

Each of the link frame bodies of the conventional cable protection and guide device 500 includes a pair of link side plates 510 (only one side of them is shown) provided so as to be spaced from each other in a lateral direction, a flexion outer circumferential-side connecting arm 520 bridging over a cable flexion outer circumferential side of the pair of link side plates 510, and a flexion inner circumferential-side connecting arm 530 bridging over a cable flexion inner circumferential side of the pair of link side plates 510.

The link side plate 510 is integrally composed of a front side plate portion 511 connected to another link side plate 510 preceding in the cable longitudinal direction to form the cable flexion inner circumferential side, a rear side plate portion 512 connected to yet another link side plate 510 succeeding in the cable longitudinal direction to form the cable flexion outer circumferential side, and a flexible linkage portion 513 interposed between the front side plate portion 511 and the rear side plate portion 512.

The cable protection and guide device 500 is configured so as to be capable of taking a linear position in which the device 500 is in contact with a support surface 541 of a support 540, and a flexional position in which the device 500 is separated from the support surface 541.

Unfortunately, because a flexion outer circumferential-side surface 521 of the flexion outer circumferential-side connecting arm 520 is coplanar with a flexion outer circumferential edge 512a of the link side plate 510, the aforementioned conventional cable protection and guide device 500 has problems. Specifically, when the device moves from the flexional position to the linear position, the problems include:

the flexion outer circumferential-side connecting arm 520 comes in contact with the support surface 541 of the support face 540 to generate noise, the flexion outer circumferential-side connecting arm 520 is abraded, and, the flexion outer circumferential-side connecting arm 520 collides with the support surface 541 of the support face 540 to be disconnected from the link side plate 510.

Accordingly, there is a need for:

a cable protection and guide device which is capable of preventing noise and abrasion powder otherwise generated by the flexion outer circumferential-side connecting arm, and, avoiding disconnection of the flexion outer circumferential-side connecting arm when the device moves from the flexional position to the linear position.

SUMMARY OF THE INVENTION

In order to address the above-mentioned problems, according to a first aspect of the present invention, there is provided a cable protection and guide device having a number of link frame bodies connected to each other in a cable longitudinal direction, each of the link frame bodies including:

a pair of link side plates provided so as to be spaced from each other in a lateral direction;

a flexion outer circumferential-side connecting arm bridging over a cable flexion outer circumferential side of the pair of link side plates; and a flexion inner circumferential-side connecting arm bridging over a cable flexion inner circumferential side of the pair of link side plates.

The device accommodates and guides a cable at the interior of the link frame bodies from a cable fixed end to a cable movable end. The device is capable of taking a linear position in which the device is in contact with a support surface of a support, and a flexional position in which the device is spaced from the support surface.

Each of the pair of link side plates integrally including:

a front side plate portion connected to a preceding link side plate in the cable longitudinal direction to form the cable flexion inner circumferential side;

a rear side plate portion connected to a succeeding link side plate in the cable longitudinal direction to form the cable flexion outer circumferential side; and a flexible linkage portion interposed between the front side plate portion and the rear side plate portion.

The flexion outer circumferential-side connecting arm is detachably mounted to the link side plates, and a flexion outer circumferential-side surface of the flexion outer circumferential-side connecting arm is provided so as to be closer to the cable flexion inner circumferential side than a flexion outer circumferential edge of the rear side plate portion.

According to a second aspect of the present invention, each of the flexion outer circumferential-side connecting arms is provided at a position corresponding to a middle position between the two linkage portions of the link frame bodies mutually adjacent in the cable longitudinal direction. Flexion inner circumferential-side surfaces of the flexion outer circumferential-side connecting arms are coplanar with each other in the linear position.

According to a third aspect of the present invention, each of the flexion inner circumferential-side connecting arms is provided at a position corresponding to a middle position between the two linkage portions of the link frame bodies mutually adjacent in the cable longitudinal direction. Flexion outer circumferential-side surfaces of the flexion inner circumferential-side connecting arms of the link frame bodies are coplanar with each other in the linear position.

According to a fourth aspect of the present invention, each of the link side plates is arranged longitudinally such that front and rear parts thereof respectively face a side of the cable movable end and a side of the cable fixed end. Each of the rear side plate portions of the link side plates has:

a rear flexion outer circumferential end surface which is in an arc shape and provided on the cable flexion outer circumference side at a position corresponding to the linkage portion of the succeeding link side plate, and, an arc center of the rear flexion outer circumferential end surface of the link side plate is provided so as to longitudinally precede a longitudinal center of the linkage portion of the succeeding link side plate.

According to a fifth aspect of the present invention, each of the link side plates includes:

a link-side hinge portion which has a link-side circumferential surface surrounding in a circumferential direction a rotating axis line extending along the cable longitudinal direction; and, a flexion outer circumferential-side connecting arm including an arm-side hinge portion which has an arm-side circumferential surface surrounding the rotating axis line in a circumferential direction and confronting the link-side circumferential surface in a radial direction centered on the rotating axis line for a rotation range of the flexion outer circumferential-side connecting arm.

The link-side hinge portion and the arm-side hinge portion constitutes a hinge structure which includes an anti-disconnect portion for preventing an arm disconnect phenomenon in which the arm-side hinge portion is disconnected from the link-side hinge portion by external force acting from the cable to the flexion outer circumferential-side connecting arm. The anti-disconnect portion includes a link-side anti-disconnect engaging portion provided on the link-side circumferential surface and an arm-side anti-disconnect engaging portion provided on the arm-side circumferential surface. The arm-side anti-disconnect engaging portion and the link-side anti-disconnect engaging portion engaging with each other to prevent the arm disconnect phenomenon when the flexion outer circumferential-side connecting arm is in a connection state in which the pair of the link side plates are connected therewith.

Advantageous Effects of Invention

According to the cable protection and guide device of the first aspect of the present invention, each of the pair of link side plates integrally includes:

the front side plate portion connected to the preceding link side plate in the cable longitudinal direction to form the cable flexion inner circumferential side;

the rear side plate portion connected to the succeeding link side plate in the cable longitudinal direction to form the cable flexion outer circumferential side; and, the flexible linkage portion interposed between the front side plate portion and the rear side plate portion: the flexion outer circumferential-side connecting arm is detachably mounted to the link side plates.

The flexion outer circumferential-side surface of the flexion outer circumferential-side connecting arm is provided so as to be closer to the cable flexion inner circumferential side than the flexion outer circumferential edge of the rear side plate portion such that when the cable protection and guide device moves from the flexional position to the linear position, a gap is created between the flexion outer circumferential-side connecting arm which has moved and the support surface of the support to prevent the flexion outer circumferential-side connecting arm from coming in contact with the support surface. Accordingly, it is possible to prevent noise otherwise generated by the flexion outer circumferential-side connecting arm.

Also, because the flexion outer circumferential-side connecting arm does not come in contact with the support surface of the support when the position of the cable protection and guide device changes, it is possible to prevent the flexion outer circumferential-side connecting arm from being abraded and to prevent generation of abrasion powder of the flexion outer circumferential-side connecting arm.

Furthermore, because the flexion outer circumferential-side connecting arm does not come in contact with the support surface of the support when at least a part of the cable protection and guide device moves from the flexional position to the linear position, it is possible to mitigate impact load and to reduce resonance and impact force transmitted to the cable protection and guide device to prevent disconnection of the flexion outer circumferential-side connecting arm.

According to the cable protection and guide device of the second aspect of the present invention:

each of the flexion outer circumferential-side connecting arms is provided at the position corresponding to the middle position between the two linkage portions of the link frame bodies mutually adjacent in the cable longitudinal direction, and, flexion inner circumferential-side surfaces of the flexion outer circumferential-side connecting arms are coplanar with each other in the linear position such that the flexion inner circumferential-side surface of each flexion outer circumferential-side connecting arm faces a center of the flexion of the cable protection and guide device in the flexional position.

The cable accommodated at the interior of the link frame bodies is put evenly on the flexion inner circumferential-side surfaces of the flexion outer circumferential-side connecting arms. Accordingly, it is possible to prevent uneven abrasion to increase protection of the cable.

According to the cable protection and guide device of the third aspect of the present invention, each of the flexion inner circumferential-side connecting arms is provided at a position corresponding to the middle position between the two linkage portions of the link frame bodies mutually adjacent in the cable longitudinal direction, and the flexion outer circumferential-side surfaces of the flexion inner circumferential-side connecting arms of the link frame bodies are coplanar with each other in the linear position, so that no difference in level is created between the flexion inner circumferential-side connecting arms of the link frame bodies mutually adjacent with each other when the cable protection and guide device moves to the flexional position, and the cable accommodated at the interior of the link frame bodies is put evenly on the flexion outer circumferential-side surfaces of the flexion inner circumferential-side connecting arms of the link frame bodies. Accordingly, it is possible to prevent uneven abrasion to increase protection of the cable.

According to the cable protection and guide device of the fourth aspect of the present invention:

each of the link side plates is arranged longitudinally such that the front and rear parts thereof respectively face the side of the cable movable end and the side of the cable fixed end, each of the rear side plate portions of the link side plates has the rear flexion outer circumferential end surface which is in the arc shape and provided on the cable flexion outer circumference side at the position corresponding to the linkage portion of the succeeding link side plate, and, the arc center of the rear flexion outer circumferential end surface of the link side plate is provided so as to longitudinally precede the longitudinal center of the linkage portion of the succeeding link side plate such that when the linkage portion is bent from an original unbent state and the rear flexion outer circumferential end surface of the rear side plate portion of the link side plate rotationally moves about a substantial center of the linkage portion, the arc center of the arc-shaped rear flexion outer circumferential end surface of the link side plate moves toward the flexion inner circumferential side, i.e., in a direction opposite to the support, to create a gap between the rear flexion outer circumferential end surface of the rear side plate portion of the link side plate and the support surface of the support as soon as the link side plate is flexed.

Accordingly, it is possible to prevent the rear flexion outer circumferential end surface of the rear side plate portion of the link side plate from sliding on the support surface of the support to prevent generation of abrasion powder.

Similarly, because the gap exists between the rear flexion outer circumferential end surface of the rear side plate portion of the link side plate and the support surface of the support while the linkage portion of the succeeding link side plate is unbent to the unbent state and the rear side plate portion of the link side plate rotationally moves about the substantial center of the linkage portion of the succeeding link side plate to come in contact with the support surface of the support, it is possible to prevent the rear flexion outer circumferential end surface of the rear side plate portion of the link side plate from sliding on the support surface of the support to prevent generation of abrasion powder.

Furthermore, because the rear flexion outer circumferential end surface of the rear side plate portion does not slide on the support surface of the support, it is possible to prevent noise that is otherwise generated when the rear flexion outer circumferential end surface of the rear side plate portion slides on the support surface of the support.

According to the cable protection and guide device of the fifth aspect of the present invention:

each of the link side plates includes the link-side hinge portion which has the link-side circumferential surface surrounding in the circumferential direction the rotating axis line extending along the cable longitudinal direction, the flexion outer circumferential-side connecting arm including the arm-side hinge portion which has the arm-side circumferential surface surrounding the rotating axis line in the circumferential direction and confronting the link-side circumferential surface in the radial direction centered on the rotating axis line for the rotation range of the flexion outer circumferential-side connecting arm, the link-side hinge portion and the arm-side hinge portion constituting the hinge structure which includes the anti-disconnect portion for preventing the arm disconnect phenomenon in which the arm-side hinge portions are disconnected from the link-side hinge portions by external force acting from the cable to the flexion outer circumferential-side connecting arm, the anti-disconnect portion including the link-side anti-disconnect engaging portion provided on the link-side circumferential surface and the arm-side anti-disconnect engaging portion provided on the arm-side circumferential surface, and, the arm-side anti-disconnect engaging portion and the link-side anti-disconnect engaging portion engaging with each other to prevent the arm disconnect phenomenon when the flexion outer circumferential-side connecting arm is in a connection state in which the pair of the link side plates are connected therewith such that the link-side anti-disconnect engaging portion and the arm-side anti-disconnect engaging portion physically engage with each other at the anti-disconnect portion and the flexion outer circumferential-side connecting arm does not come in contact with the support surface of the support.

Accordingly, it is possible to reliably prevent accidental disconnection of the flexion outer circumferential-side connecting arm when switching between the linear position and the flexional position.

BRIEF DESCRIPTION OF DRAWINGS

FIG. 6A is a cross-sectional view of a part of the cable protection and guide device of one embodiment of the present invention as seen in a cable longitudinal direction;

DETAILED DESCRIPTION OF PREFERRED EMBODIMENT

The cable protection and guide device of the present invention is not limited as long as the device has:

a number of link frame bodies connected to each other in a cable longitudinal direction;

each of the link frame bodies including a pair of link side plates provided so as to be spaced from each other in a lateral direction;

a flexion outer circumferential-side connecting arm bridging over a cable flexion outer circumferential side of the pair of link side plates; and, a flexion inner circumferential-side connecting arm bridging over a cable flexion inner circumferential side of the pair of link side plates.

The device accommodates and guides a cable at the interior of the link frame bodies from a cable fixed end to a cable movable end. The device is capable of taking a linear position in which the device is in contact with a support surface of a support, and a flexional position in which the device is spaced from the support surface.

Each of the pair of link side plates integrally includes:

a front side plate portion connected to a preceding link side plate in the cable longitudinal direction to form the cable flexion inner circumferential side;

a rear side plate portion connected to a succeeding link side plate in the cable longitudinal direction to form the cable flexion outer circumferential side; and, a linkage portion interposed between the front side plate portion and the rear side plate portion and being flexible.

The flexion outer circumferential-side connecting arm is detachably mounted to the link side plates.

A flexion outer circumferential-side surface of the flexion outer circumferential-side connecting arm is closer to the cable flexion inner circumferential side than a flexion outer circumferential edge of the rear side plate portion so that it is possible to mitigate noise, prevent abrasion of the flexion outer circumferential end connecting arm, and avoid disconnection of the flexion outer circumferential end connecting arm when moving from the flexional position to the linear position.

For example, a material of the link side plate used in the cable protection and guide device of the present invention may be synthetic resin such as engineering resin or metal such as aluminum. The shape of the link side plate is not particularly limited as long as the link side plate can constitute a part of the link frame body and can be connected to another link side plate in a cable longitudinal direction such that a cable inserted into the interior of the link frame bodies can be flexed backward in the cable longitudinal direction when the device is moved.

Also, the cable may be any flexible linear object, such as an electric cable or a hose that is used in a machine for supplying electricity, transmitting signals, or conducting material such as fluid.

Embodiments

A cable protection and guide device 100 of one embodiment of the present invention will now be described with reference to FIGS. 1 to 10B.

Figure 1:
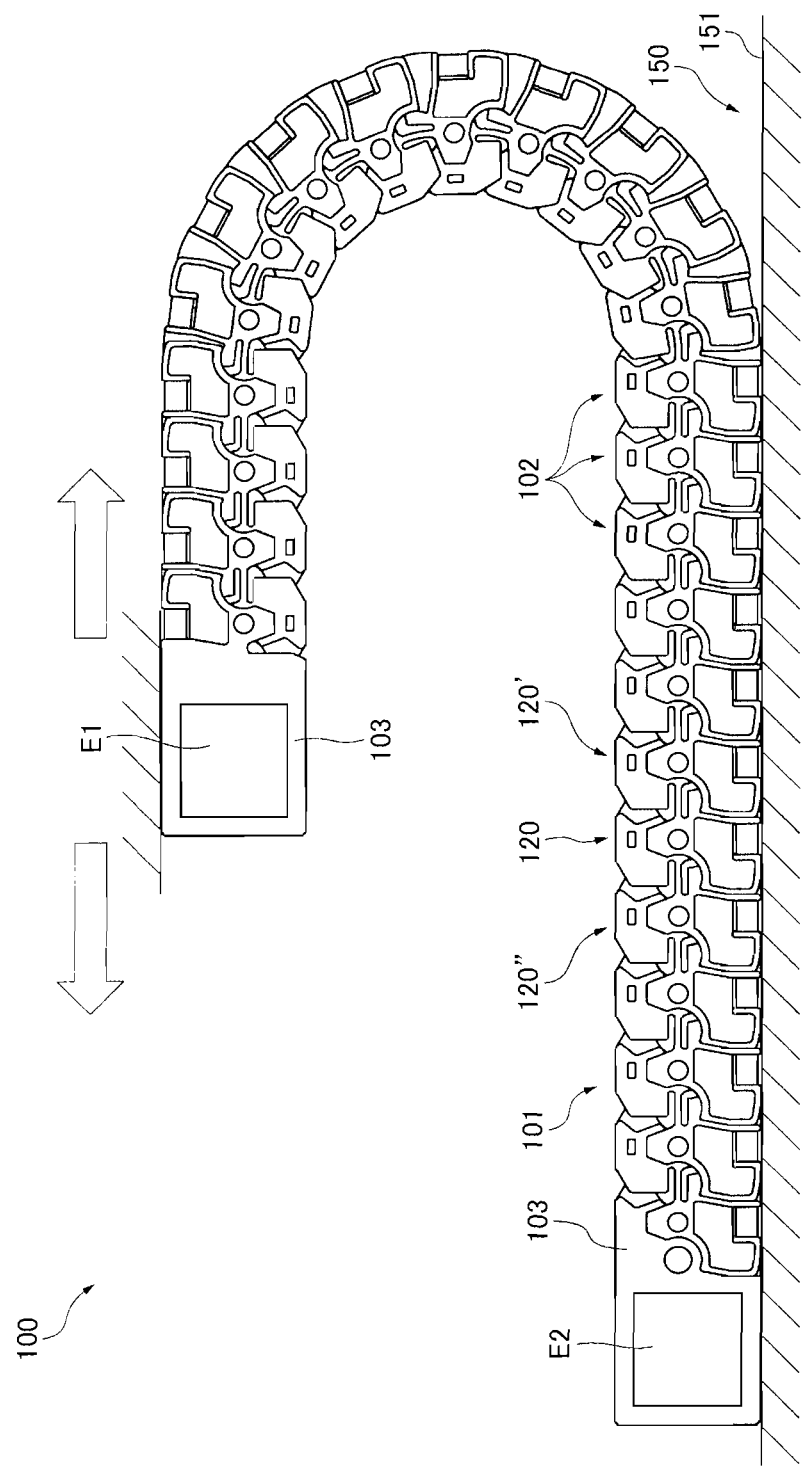
FIG. 1 is a schematic front view of a cable protection and guide device of one embodiment of the present invention.

FIG. 1 is a schematic front view of a cable protection and guide device 100 of one embodiment of the present invention.

Figure 2:
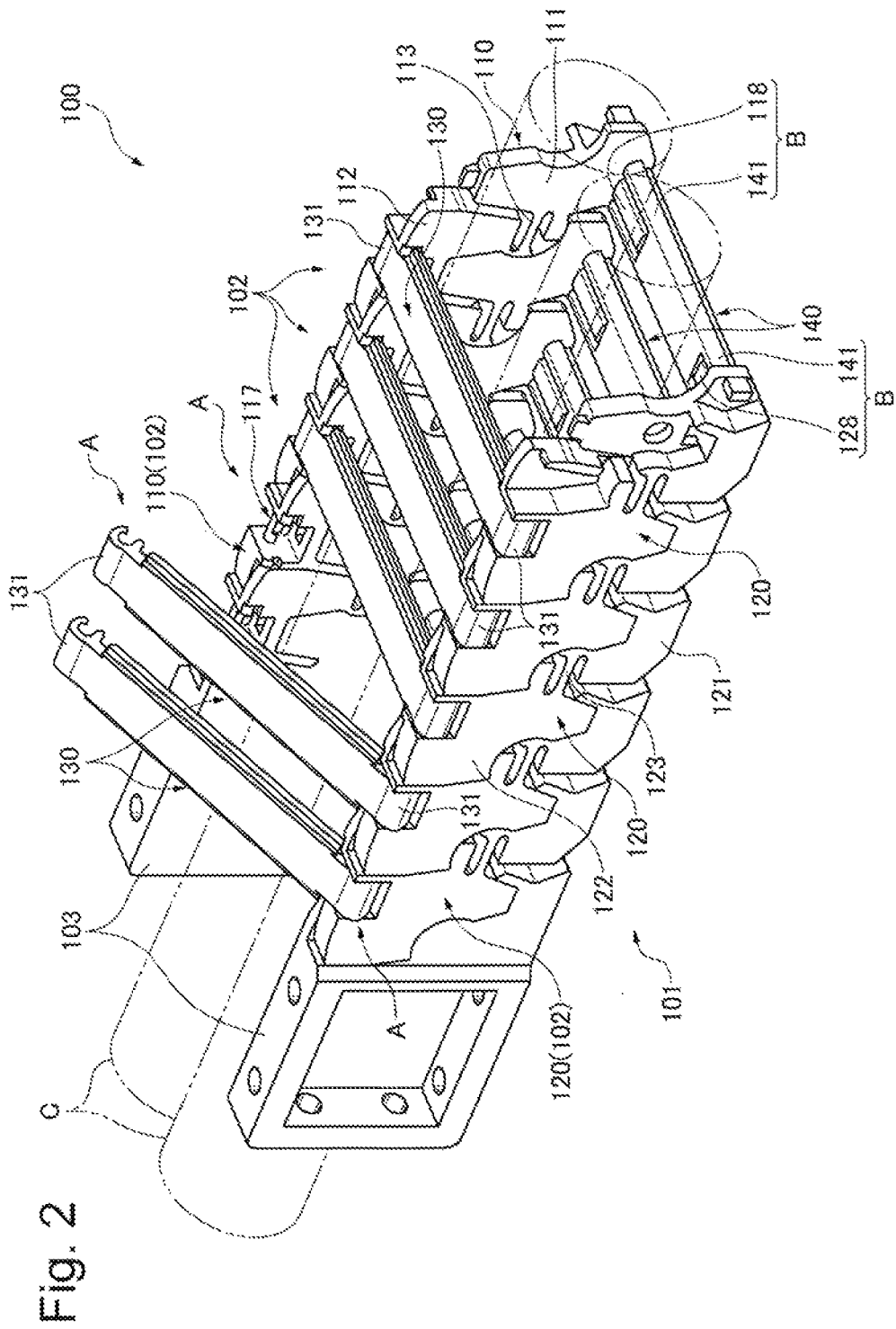
FIG. 2 is a perspective view of the cable protection and guide device of one embodiment of the present invention.

FIG. 2 is a perspective view of the cable protection and guide device 100 of one embodiment of the present invention.

Figure 3:
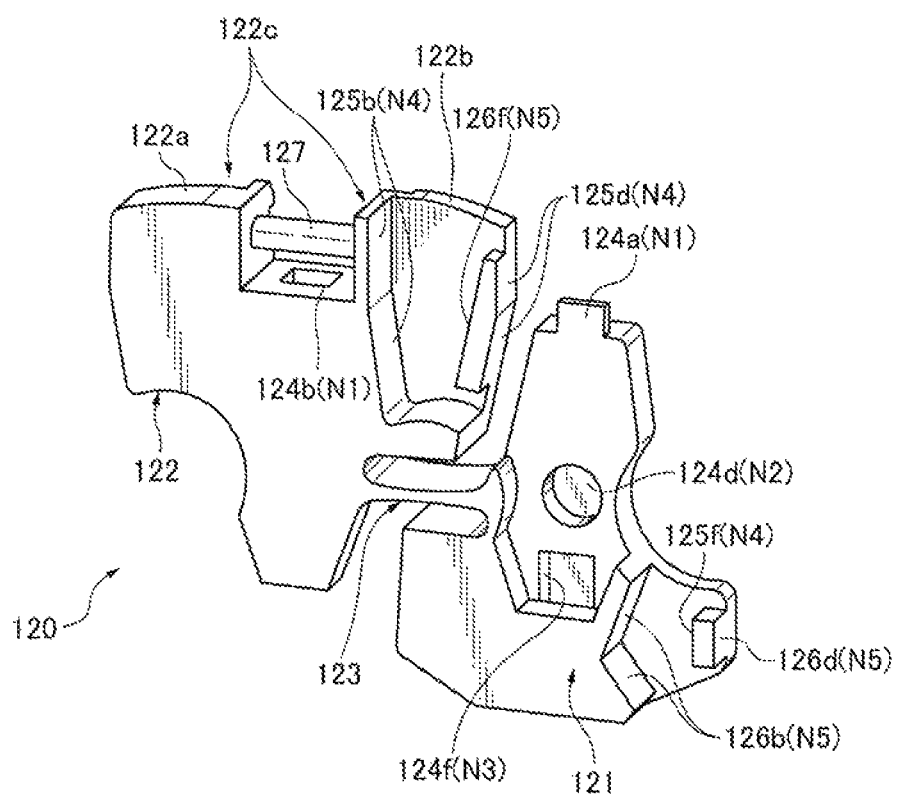
FIG. 3 is a perspective view of a second link side plate in one embodiment of the present invention as seen from an outer side of the device.

FIG. 3 is a perspective view of a second link side plate 120 in one embodiment of the present invention as seen from an outer side of the device.

Figure 4:
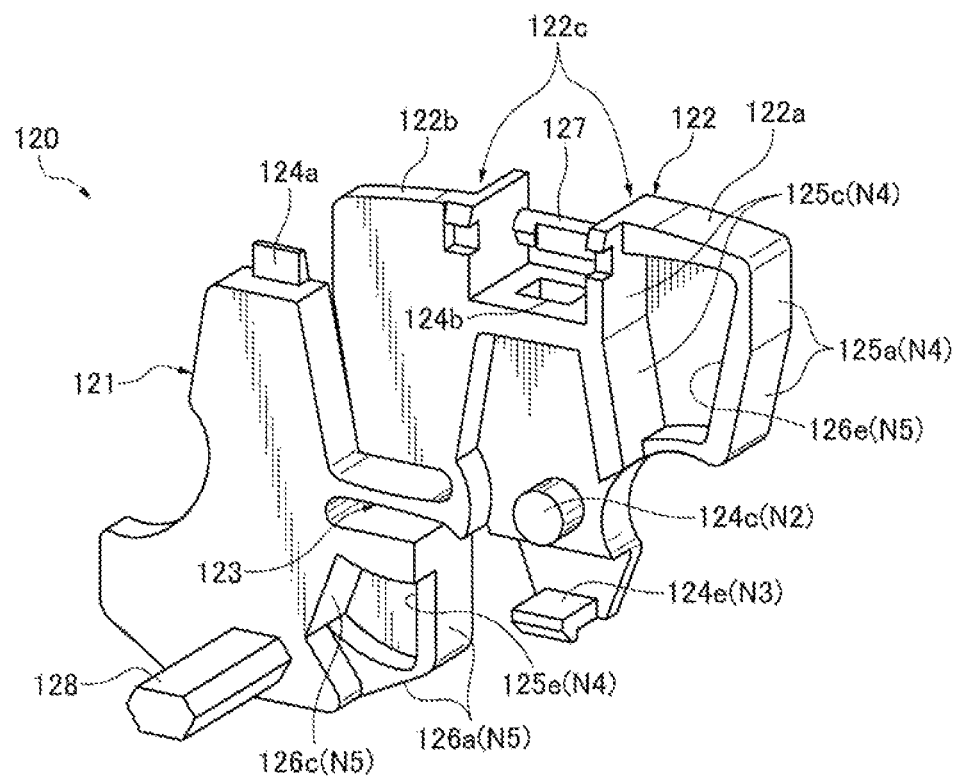
FIG. 4 is a perspective view of the second link side plate in one embodiment of the present invention as seen from an inner side of the device.

FIG. 4 is a perspective view of the second link side plate 120 in one embodiment of the present invention as seen from an inner side of the device.

Figure 5A:
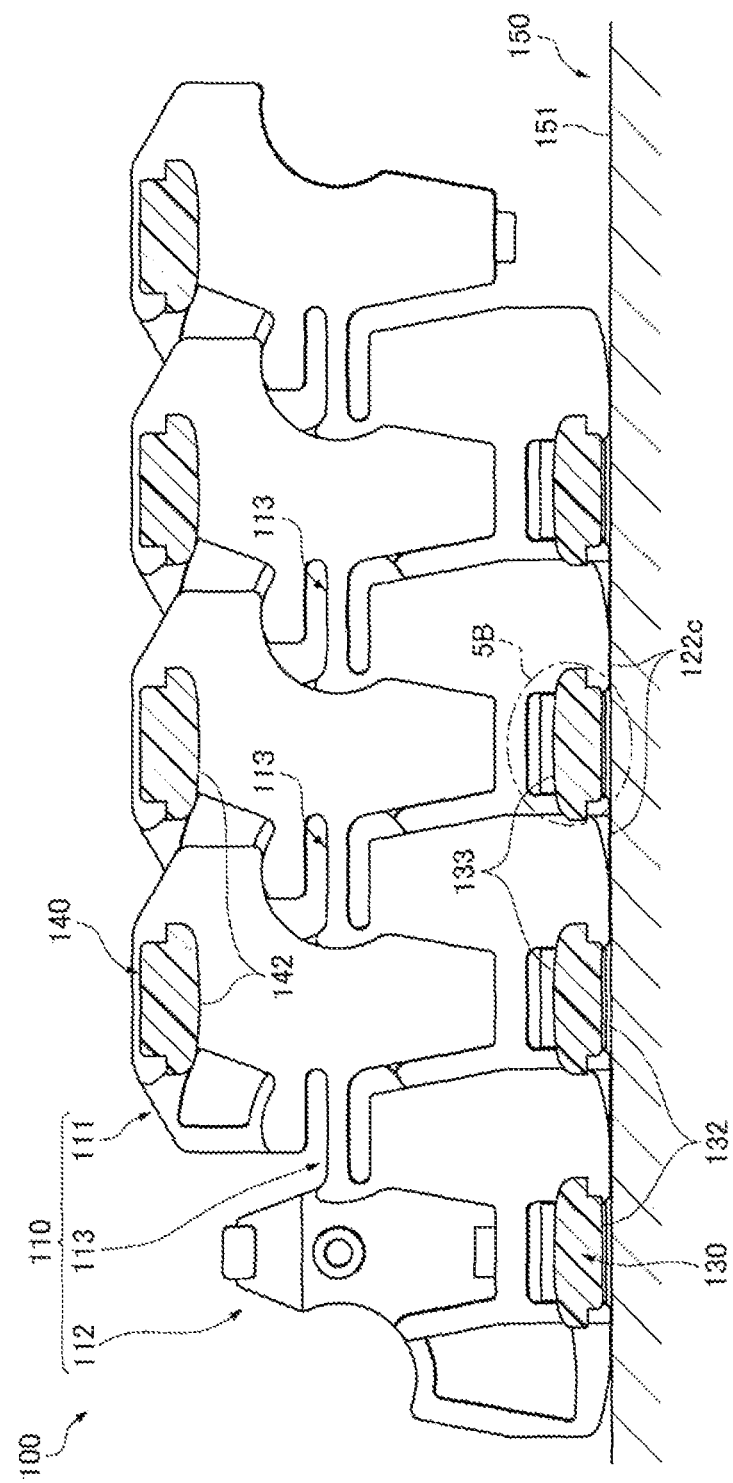
FIG. 5A is a cross-sectional view of the cable protection and guide device of one embodiment of the present invention as seen from the interior thereof toward a side of the second link side plate.

FIG. 5A is a cross-sectional view of the cable protection and guide device 100 of one embodiment of the present invention as seen from the interior thereof toward a side of the second link side plate 120.

Figure 5B:
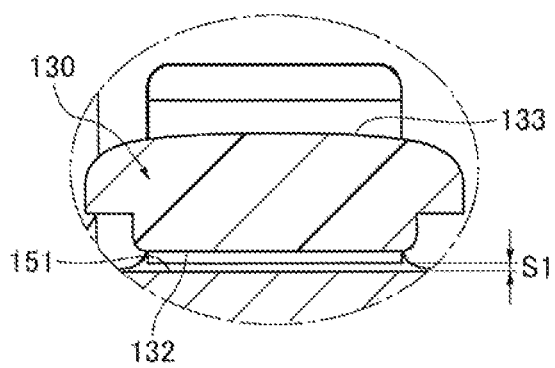
FIG. 5B is an enlarged cross-sectional view of a portion marked as 5B in FIG. 5A.

FIG. 5B is an enlarged cross-sectional view of a portion marked as 5B in FIG. 5A.

FIG. 6A is a cross-sectional view of a part of the cable protection and guide device 100 of one embodiment of the present invention as seen in a cable longitudinal direction.

Figure 6B:
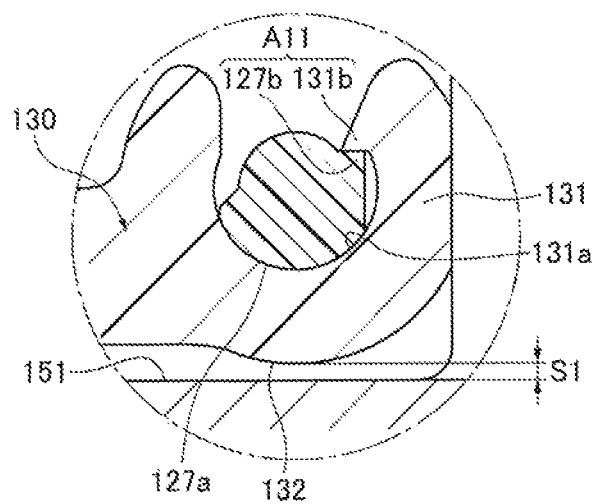
FIG. 6B is an enlarged cross-sectional view of a portion marked as 6B in FIG. 6A.

FIG. 6B is an enlarged cross-sectional view of a portion marked as 6B in FIG. 6A.

Figure 7:
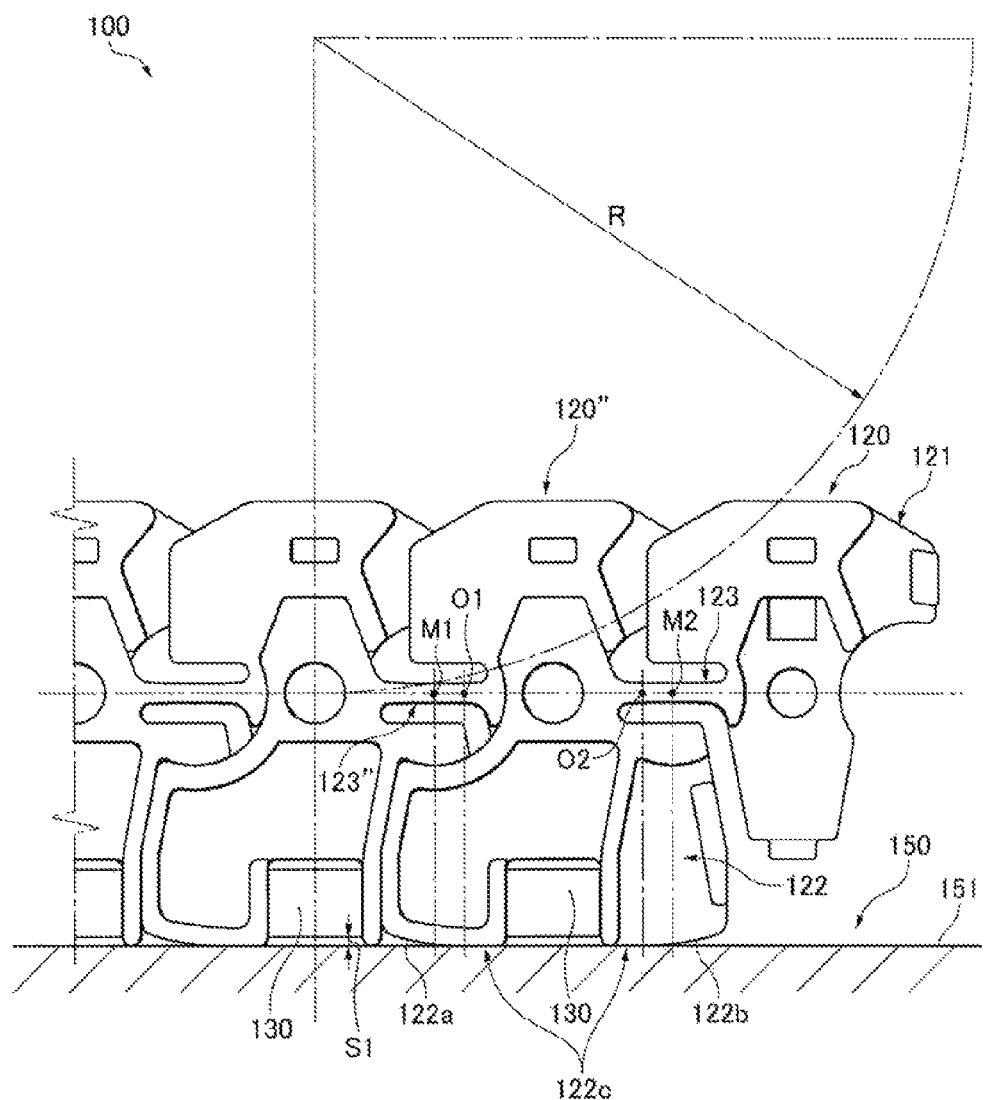
FIG. 7 is a diagram showing the cable protection and guide device of one embodiment of the present invention in a linear position.

FIG. 7 is a diagram showing the cable protection and guide device 100 of one embodiment of the present invention in a linear position.

Figure 8A:
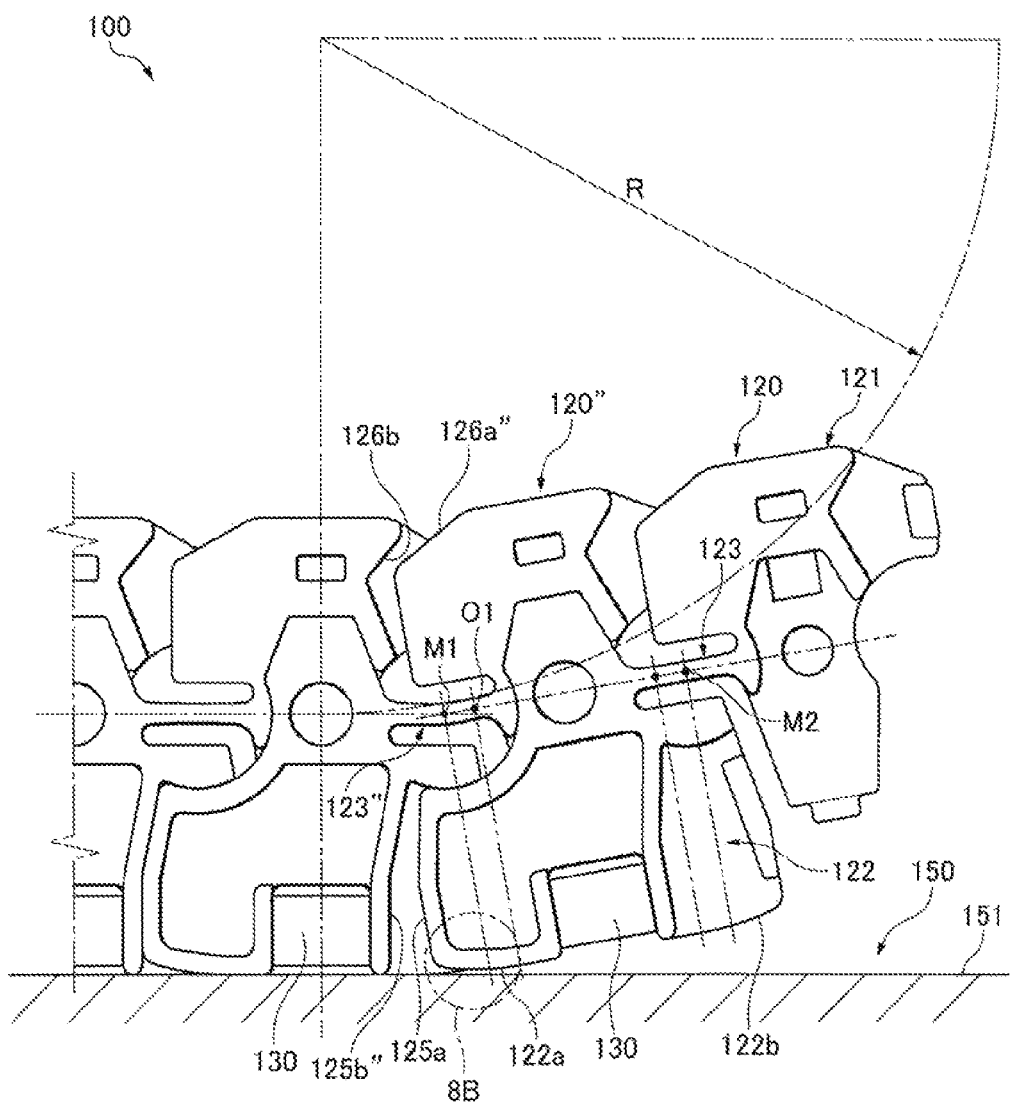
FIG. 8A is a diagram showing the cable protection and guide device of one embodiment of the present invention at the beginning of flexing.

FIG. 8A is a diagram showing the cable protection and guide device 100 of one embodiment of the present invention at the beginning of flexing.

Figure 8B:
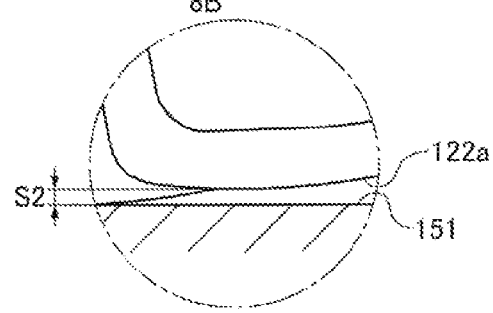
FIG. 8B is an enlarged view of a portion marked as 8B in FIG. 8A.

FIG. 8B is an enlarged view of a portion marked as 8B in FIG. 8A.

Figure 9A:
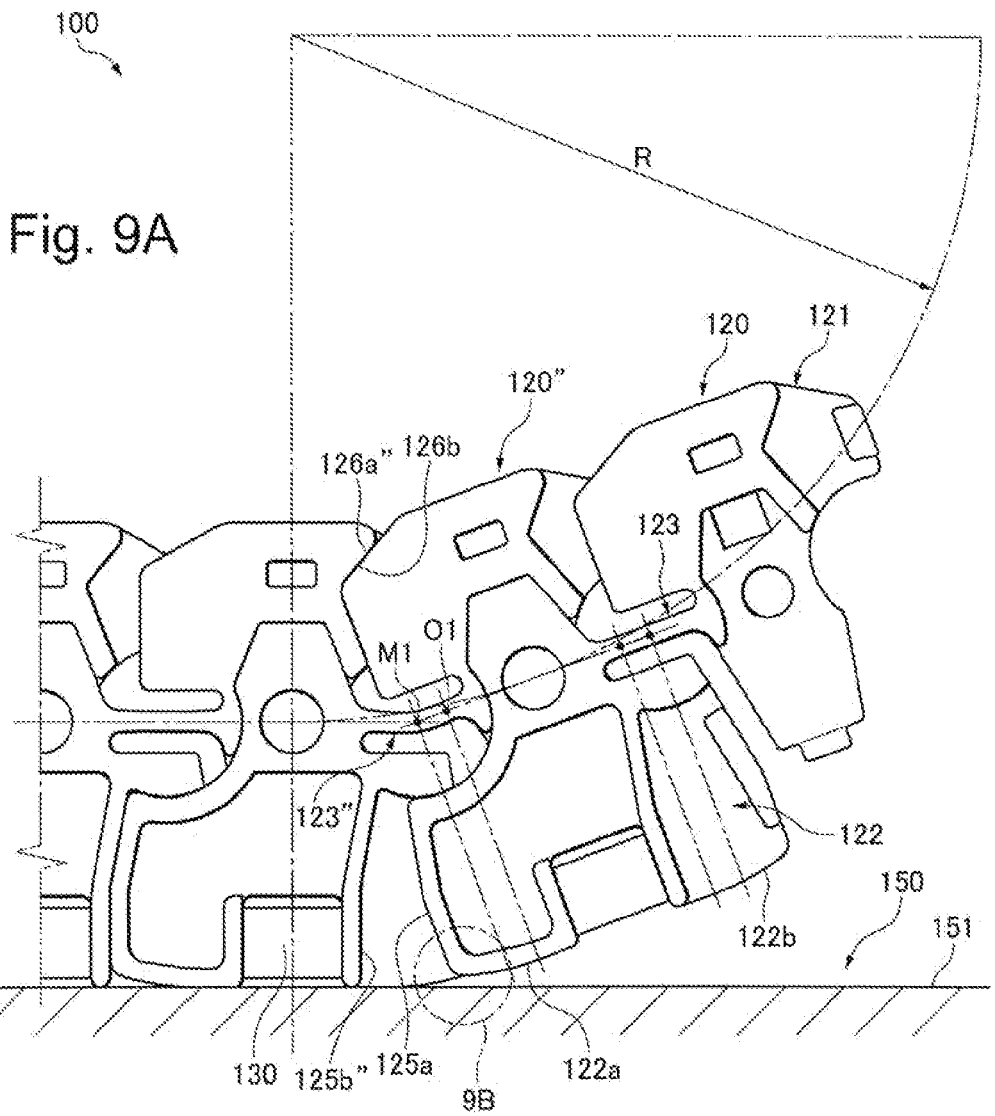
FIG. 9A is a diagram showing the cable protection and guide device of one embodiment of the present invention in a flexional position.

FIG. 9A is a diagram showing the cable protection and guide device 100 of one embodiment of the present invention in a flexional position.

Figure 9B:
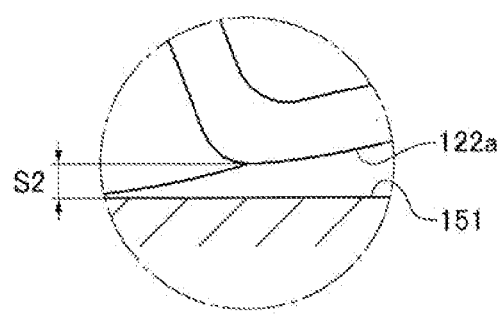
FIG. 9B is an enlarged view of a portion marked as 9B in FIG. 9A.

FIG. 9B is an enlarged view of a portion marked as 9B in FIG. 9A.

Figure 10A:
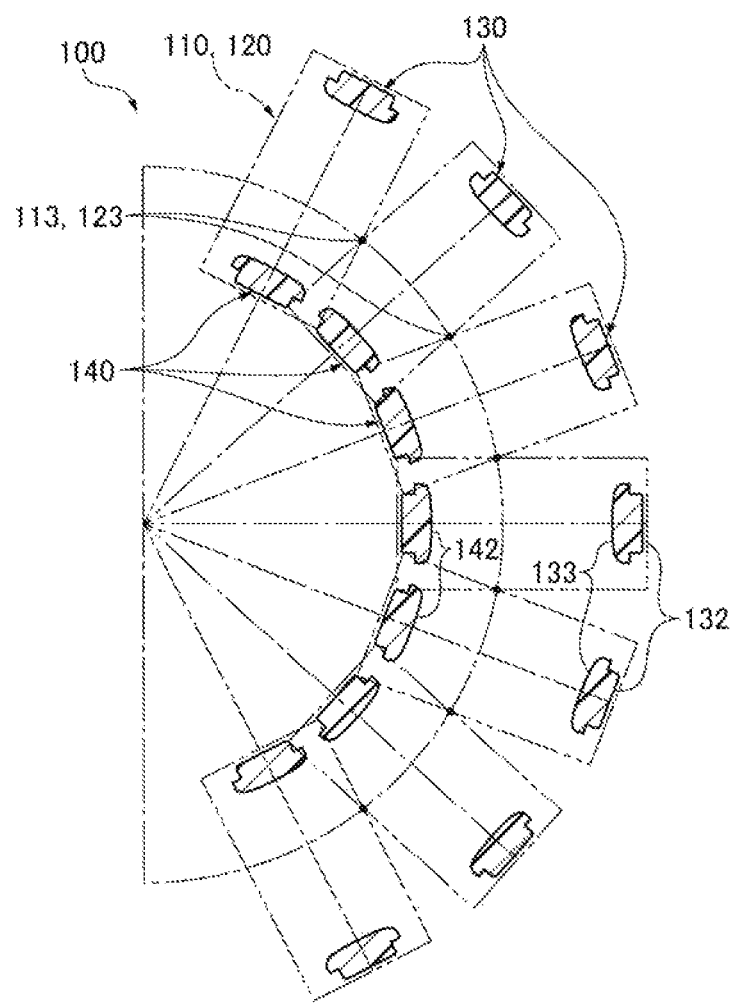
FIG. 10A is a cross-sectional view schematically showing the cable protection and guide device of one embodiment of the present invention in the flexional position.
Figure 10B:
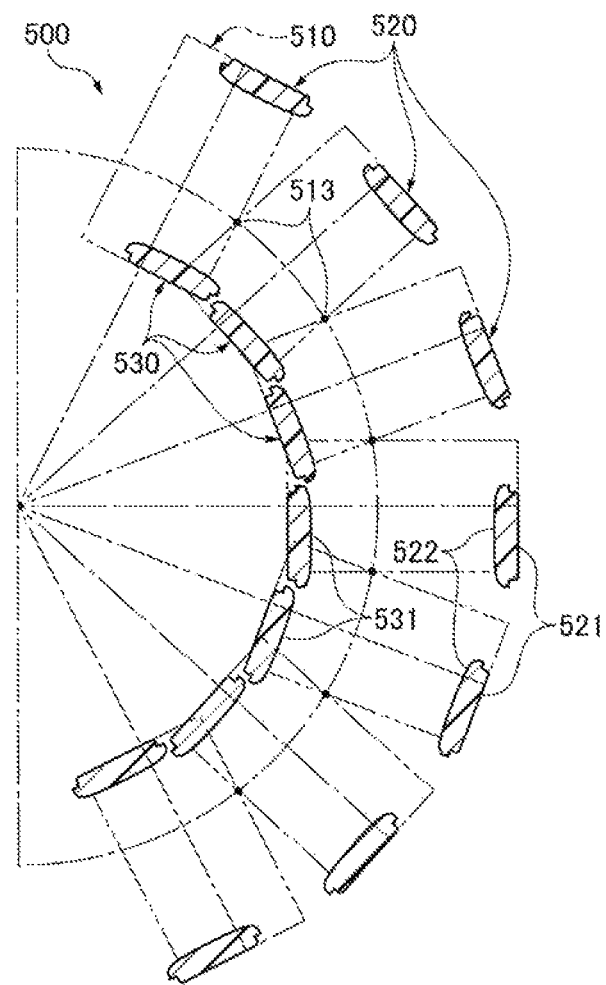
FIG. 10B is a cross-sectional view schematically showing a cable protection and guide device of the prior art as a comparison example.
Figure 11A:
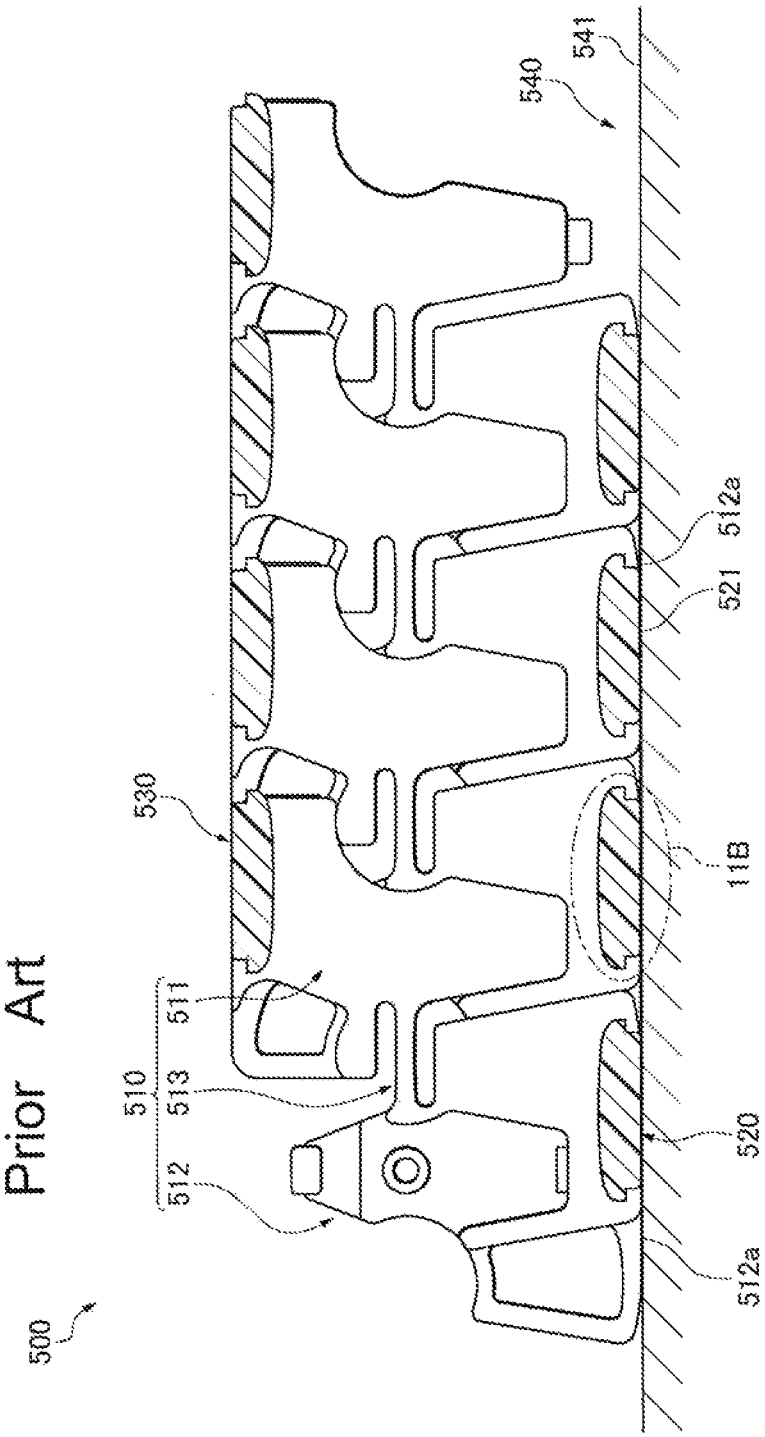
FIG. 11A is a cross-sectional view showing a part of the cable protection and guide device of the prior art.
Figure 11B:
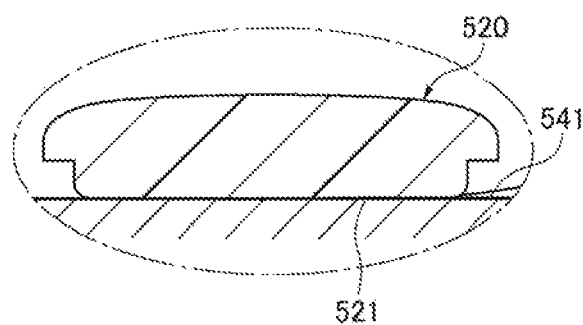
FIG. 11B is an enlarged cross-sectional view of a portion marked as 11B in FIG. 11A.

FIGS. 10A and 10B are schematic cross-sectional views for comparing the flexional position between one embodiment of the present invention and a comparison example.

Of these, FIG. 10A shows the cable protection and guide device 100 of one embodiment of the present invention, and FIG. 10B shows a cable protection and guide device 500 of the prior art as a comparison example.

As shown in FIGS. 1 to 10A, the cable protection and guide device 100 of one embodiment of the present invention is provided in a machine (not shown) that includes a cable C, and is used for protecting and guiding the cable C.

The machine may be semiconductor production equipment, pharmaceutical development and test equipment, a vehicle door opening and closing device, or a machine tool.

The cable protection and guide device 100 has a number of link frame bodies connected to each other in a cable longitudinal direction. Each of the link frame bodies includes:

a pair of a first link side plate 110 and a second link side plate 120 provided so as to be spaced from each other in a lateral direction;

a flexion outer circumferential-side connecting arm 130 bridging over a cable flexion outer circumferential side of the first link side plate 110 and the second link side plate 120; and, a flexion inner circumferential-side connecting arm 140 bridging over a cable flexion inner circumferential side of the first link side plate 110 and the second link side plate 120.

The device 100 accommodates and guides the cable C at the interior of the link frame bodies from a cable fixed end E2 to a cable movable end E1, and is capable of taking a linear position in which the device 100 is in contact with a support surface 151 of a support 150, and a flexional position in which the device 100 is separated from the support surface 151.

Specifically, as shown in FIG. 1, the cable fixed end E2 of the cable protection and guide device 100 is connected to a stationary portion of the machine via a mounting portion 103, and the cable movable end E1 of the cable protection and guide device 100 is connected to a movable portion of the machine via another mounting portion 103. The cable protection and guide device 100 is flexible so as to wholly or partially take the linear position or the flexional position in accordance with the movement of the cable C between the movable portion and the stationary portion.

As shown in FIG. 2, the cable protection and guide device 100 includes a link row group 101 consisting of a plurality of link rows 102 arranged and flexibly connected to each other in the cable longitudinal direction, a plurality of the flexion outer circumferential-side connecting arms 130, and a plurality of the flexion inner circumferential-side connecting arms 140.

Each link row 102 consists of a pair of the first and second link side plates 110 and 120 provided so as to be spaced from each other in a lateral direction.

The flexion outer circumferential-side connecting arm 130 connects a pair of the first and second link side plates 110 and 120 at the cable flexion outer circumferential side, and is detachably mounted to the pair of the first and second link side plates 110 and 120 with a mounting structure A.

The mounting structure A includes hinge shafts 117 and 127 respectively formed on a pair of the first and second link side plates 110 and 120, and hooks 131 formed at both ends of the flexion outer circumferential-side connecting arm 130.

The flexion inner circumferential-side connecting arm 140 connects a pair of the first and second link side plates 110 and 120 at the cable flexion inner circumferential side, and is detachably mounted to the pair of the first and second link side plates 110 and 120 with a mounting structure B.

The mounting structure B includes engaging portions 118 and 128 respectively formed on the pair of the first and second link side plates 110 and 120, and arm engaging portions 141 formed on the flexion inner circumferential-side connecting arm 140.

The pair of the first and second link side plates 110 and 120 will now be described with reference to FIGS. 3 and 4.

In the present embodiment, each second link side plate 120 integrally includes a front side plate portion 121 which is connected to a second link side plate 120' preceding in the cable longitudinal direction to form the cable flexion inner circumferential side, a rear side plate portion 122 which is connected to a succeeding second link side plate 120" to form the cable flexion outer circumferential side, and a flexible linkage portion 123 which is interposed between the front side plate portion 121 and the rear side plate portion 122.

In the present embodiment, each first link side plate 110 integrally includes a front side plate portion 111 which is connected to a first link side plate 110' preceding in the cable longitudinal direction to form the cable flexion inner circumferential side, a rear side plate portion 112 which is connected to a succeeding first link side plate 110" to form the cable flexion outer circumferential side, and a flexible linkage portion 113 which is interposed between the front side plate portion 111 and the rear side plate portion 112.

Because the first and link side plates 110 and 120 are bilaterally symmetrical with respect to an axis in the cable longitudinal direction, only the second link side plate 120 will be described in FIGS. 3 and 4 to avoid duplicate description of the first link side plate 110.

Also, for the purpose of facilitating understanding of this description, a preceding second link side plate of the second link side plate 120 (that is, a second link side plate connected to the second link side plate 120 at a front side of the second link side plate 120 in the cable longitudinal direction) will be denoted as 120', while a succeeding second link side plate of the second link side plate 120 (that is, a second link side plate connected to the second link side plate 120 at a rear side of the second link side plate 120 in the cable longitudinal direction) will be denoted as 120".

Similarly, a single quotation mark "'" and a double quotation mark """ will be used for reference numerals that denote elements of the preceding second link side plate 120' and the succeeding second link side plate 120", respectively. Also, specific illustration will be avoided for elements of the preceding second link side plate 120' and the succeeding second link side plate 120" when positions and shapes of those elements can be perceived from the illustration of corresponding elements of the second link side plate 120.

The second link side plate 120 includes first to third connecting structures N1 to N3 for connecting to the second link side plate 120' which is adjacent thereto in the cable longitudinal direction.

The first connecting structure N1 consists of a first fitting convex portion 124a provided on the front side plate portion 121 and a first fitting concave portion 124b provided on the rear side plate portion 122. The first fitting convex portion 124a of the front side plate portion 121 of the second link side plate 120 fits to a first fitting concave portion 124b' of a rear side plate portion 122' of the preceding second link side plate 120'.

Similarly, the second connecting structure N2 consists of a second fitting concave portion 124d provided on the front side plate portion 121 and a second fitting convex portion 124c provided on the rear side plate portion 122. The second fitting concave portion 124d of the front side plate portion 121 of the second link side plate 120 fits to a second fitting convex portion 124c' of the rear side plate portion 122' of the preceding second link side plate 120'.

Furthermore, the third connecting structure N3 consists of a third fitting concave portion 124f provided on the front side plate portion 121 and formed in a shape that is capable of catching a nail, and a third fitting convex portion 124e provided on the rear side plate portion 122 and formed in a shape of a nail. The third fitting concave portion 124f of the front side plate portion 121 of the second link side plate 120 fits to a third fitting convex portion 124e' of the rear side plate portion 122' of the preceding second link side plate 120' such that the third fitting concave portion 124f catches the nail-shaped third fitting convex portion 124e'.

In this way, a plurality of the second link side plates 120 are consecutively connected in the cable longitudinal direction.

The second link side plate 120 also includes a linear position holding structure N4 for holding the cable protection and guide device 100 in the linear position, and a flexional position restricting structure N5 for restricting the flexional position of the cable protection and guide device 100 at a maximum flexional position.

The maximum flexional position is a position in which the cable protection and guide device 100 is flexed at the linkage portions 123 with a flexion radius R shown in FIGS. 7, 8A and 9A.

The linear position holding structure N4 consists of first to sixth linear position holding surfaces 125a to 125f. The first linear position holding surface 125a, the second linear position holding surface 125b, the third linear position holding surface 125c, and the fourth linear position holding surface 125d are provided on the rear side plate portion 122, and the fifth linear position holding surface 125*e* and the sixth linear position holding surface 125*f* are provided on the front side plate portion 121.

In the linear position, the sixth linear position holding surface 125*f* of the front side plate portion 121 of the link side plate 120 is in surface contact with a fifth linear position holding surface 125*e'* of a front side plate portion 121' of the preceding second link side plate 120', the second linear position holding surface 125*b* of the rear side plate portion 122 of the second link side plate 120 is in surface contact with a first linear position holding surface 125*a'* of the rear side plate portion 122' of the preceding second link side plate 120', and the fourth linear position holding surface 125*d* of the rear side plate portion 122 of the second link side plate 120 is in surface contact with a third linear position holding surface 125*c'* of the rear side plate portion 122' of the preceding second link side plate 120'.

This arrangement enables maintenance of the linear position of the cable protection and guide device 100.

The flexional position restricting structure N5 consists of first to sixth flexional position restricting surfaces 126*a* to 126*f*. The first flexional position restricting surface 126*a*, the second flexional position restricting surface 126*b*, the third flexional position restricting surface 126*c*, and the fourth flexional position restricting surface 126*d* are provided on the front side plate portion 121, and the fifth flexional position restricting surface 126*e* and the sixth flexional position restricting surface 126*f* are provided on the rear side plate portion 122.

In the maximum flexional position, the second flexional position restricting surface 126*b* of the front side plate portion 121 of the link side plate 120 is in surface contact with a first flexional position restricting surface 126*a'* of the front side plate portion 121' of the preceding second link side plate 120', the fourth flexional position restricting surface 126*d* of the front side plate portion 121 of the second link side plate 120 is in surface contact with a third flexional position restricting surface 126*c'* of the front side plate portion 121' of the preceding second link side plate 120', and the sixth flexional position restricting surface 126*f* of the rear side plate portion 122 of the second link side plate 120 is in surface contact with a fifth flexional position restricting surface 126*e'* of the rear side plate portion 122' of the preceding second link side plate 120'.

This arrangement restricts the flexional position of the cable protection and guide device 100.

Also, in the present embodiment, the flexion outer circumferential-side connecting arm 130 is detachably mounted on the first and second link side plates 110 and 120 with the hooks 131 and the hinge shafts 117 and 127 of the mounting structure A described above. As shown in FIGS. 5A to 6B, a flexion outer circumferential-side surface 132 of the flexion outer circumferential-side connecting arm 130 is provided so as to be closer to the cable flexion inner circumferential side than a flexion outer circumferential edge 112*c* (122*c*) of the rear side plate portion 112 (122) of the first link side plate 110 (second link side plate 120).

With this configuration, when at least a part of the cable protection and guide device 100 moves from the flexional position to the linear position, a gap is created between the flexion outer circumferential-side connecting arm 130 which has moved and the support surface 151 of the support 150 to prevent the flexion outer circumferential-side connecting arm 130 from coming in contact with the support surface 151.

Also, when at least a part of the cable protection and guide device 100 moves from the flexional position to the linear position, the flexion outer circumferential-side connecting arm 130 does not collide with the support surface 151 of the support 150.

The hinge shafts 117 and 127, which are link-side hinge portions of the first and second link side plates 110 and 120, respectively, have a link-side circumferential surface 127*a* surrounding in a circumferential direction a rotating axis line extending along the cable longitudinal direction.

In this description, because the first link side plate 110 and the second link side plate 120 are bilaterally symmetrical, only the second link side plate 120 will be described to avoid duplicate description of the first link side plate 110.

Also, the hooks 131 and 131, which are arm-side hinge portions of the flexion outer circumferential-side connecting arm 130, respectively, have an arm-side circumferential surface 131*a* surrounding the rotating axis line in the circumferential direction and confronting the link-side circumferential surface 127*a* in a radial direction centered on the rotating axis line for a rotation range of the flexion outer circumferential-side connecting arm 130.

The hinge shafts 117 and 127 and the hooks 131 constitute a hinge structure which includes an anti-disconnect portion A11 for preventing an arm disconnect phenomenon in which the hooks 131 are disconnected from the hinge shafts 117 and 127 by external force acting from the cable C to the flexion outer circumferential-side connecting arm 130.

The anti-disconnect portion A11 consists of a convex-shaped link side engaging element 127*b*, i.e., a link-side anti-disconnect engaging portion, provided on the link-side circumferential surface 127*a*, and a nail-shaped arm-side engaging element 131*b*, i.e., an arm-side anti-disconnect engaging portion, provided on the arm-side circumferential surface 131*a*. The arm-side engaging element 131*b* and the link side engaging element 127*b* engage to prevent the arm disconnect phenomenon when the flexion outer circumferential-side connecting arm 130 connects the first and second link side plates 110 and 120.

This arrangement reliably prevents accidental disconnection of the flexion outer circumferential-side connecting arm 130 in response to movement of the device between the linear position and the flexional position.

Furthermore, each of the flexion outer circumferential-side connecting arms 130 resides between the flexible linkage portions 113, 113 of successive side plates. In other words, the connecting arms 130 reside in the middle between two linkage portions 113, 113 of successive side plates. The flexion inner circumferential-side surfaces 133 of the flexion outer circumferential-side connecting arms 130 of the link frame bodies are coplanar with each other in the linear position.

With this configuration, when the cable protection and guide device 100 moves to the flexional position, as described below, the flexion inner circumferential-side surface 133 of each flexion outer circumferential-side connecting arm 130 faces the center of the flexion of the device. The cable C accommodated at the interior of the link frame bodies is put evenly on the flexion inner circumferential-side surfaces 133 of the flexion outer circumferential-side connecting arms 130 of the link frame bodies (see FIG. 10A).

Similarly, each of the flexion inner circumferential-side connecting arms 140 is provided at a position corresponding to a middle position between the two flexible linkage portions 113 of the link frame bodies mutually adjacent in the cable longitudinal direction. The flexion outer circumferential-side surfaces 142 of the flexion inner circumferential-side connecting arms 140 of the link frame bodies are coplanar with each other in the linear position.

With this configuration, when the cable protection and guide device 100 moves to the flexional position, no difference in level is created between the flexion inner circumferential-side connecting arms 140 of the mutually adjacent link frame bodies. The cable C accommodated at the interior of the link frame bodies is put evenly on the flexion outer circumferential-side surfaces 142 of the flexion inner circumferential-side connecting arms 140 of the link frame bodies (see FIG. 10A).

As shown in FIG. 7, each of the second link side plates 120 (first link side plate) is arranged longitudinally such that front and rear parts thereof respectively face a side of the cable movable end E1 and a side of the cable fixed end E2. Each of the rear side plate portions 122 of the second link side plate 120 has a rear flexion outer circumferential end surface 122a which is in an arc shape and provided on the cable flexion outer circumference side at a position corresponding to a flexible linkage portion 123" of the succeeding second link side plate 120". An arc center O1 of the rear flexion outer circumferential end surface 122a of the second link side plate 120 is provided so as to longitudinally precede a longitudinal center M1 of the linkage portion 123" of the succeeding second links side plate 120".

With this configuration, when the linkage portion 123" of the succeeding second link side plate 122" is bent from an original unbent state and the rear flexion outer circumferential end surface 122a of the rear side plate portion 122 of the link side plate 120 rotationally moves about a substantial center of the linkage portion 123" of the succeeding second link side plate 122", a gap S2 is created between the rear flexion outer circumferential end surface 122a of the rear side plate portion 122 of the second link side plate 120 and the support surface 151 of the support 150 (see FIGS. 8A to 9B).

The rear side plate portion 122 of the second link side plate 120 also has a front flexion outer circumferential end surface 122b which is in an arc shape and provided on the cable flexion outer circumferential side at a position corresponding to the flexible linkage portion 123 of the second link side plate 120. An arc center O2 of the front flexion outer circumferential end surface 122b of the second link side plate 120 is provided so as to longitudinally succeed a longitudinal center M2 of the linkage portion 123 of the second link side plate 120.

With this configuration, when the cable protection and guide device 100 moves to the flexional position, the front flexion outer circumferential end surface 122b of the rear side plate portion 122 of the second link side plate 120 and a rear flexion outer circumferential end surface 122a' of a rear side plate portion 122' of a preceding second link side plate 120' intersect each other without creating a difference in level in the lateral direction.

Also, a curvature radius of the rear flexion outer circumferential end surface 122a and a curvature radius of the front flexion outer circumferential end surface 122b are equal to a length from the support surface 151 of the support 150 to the linkage portion 123 of the second link side plate 120 which is in contact with the support surface 151.

With this configuration, when the linkage portion 123" is bent from an original unbent state and the rear flexion outer circumferential end surface 122a rotationally moves about a substantial center of the linkage portion 123", the gap S2 is created more reliably between the rear flexion outer circumferential end surface 122a and the support surface 151 of the support 150 (see FIGS. 8A to 9B), and an edge at the flexion outer circumferential side formed with the rear flexion outer circumferential end surface 122a and the front flexion outer circumferential end surface 122b" becomes smoother in the linear position and the flexional position.

The change from the linear position to the flexional position will now be described with reference to FIGS. 7 to 9B.

As shown in FIG. 7, when the cable protection and guide device 100 is in the linear position, each of flexion outer circumferential edges 122c of the rear side plate portions 122 of the second link side plates 120 is in surface contact with the support surface 151 of the support 150.

At this point, the arc-shaped rear flexion outer circumferential end surface 122a of the rear side plate portion 122 of the second link side plate 120 is slightly in contact with the support surface 151 of the support 150 at a front portion thereof in the cable longitudinal direction.

Also, the flexion outer circumferential-side surface 132 of the flexion outer circumferential-side connecting arm 130 is provided so as to be closer to the cable flexion inner circumferential side than the flexion outer circumferential edge 112c (122c) of the rear side plate portion 111 (122), as described above.

This arrangement enables to create the gap S1 between the flexion outer circumferential-side connecting arm 130 and the support surface 151 of the support 150 in the linear position to prevent the flexion outer circumferential-side connecting arm 130 from coming in contact with the support surface 151.

As shown in FIGS. 8A and 8B, as the cable movable end E1 (see FIG. 1) moves from the state shown in FIG. 7, the cable protection and guide device 100 gradually takes the flexional position in the cable longitudinal direction.

Specifically, as a linkage portion 123" of the succeeding second link side plate 120" connected to the second link side plate 120 is bent:

the first linear position holding surface 125a of the rear side plate portion 122 of the second link side plate 120 moves away from the second linear position holding surface 125b" of the rear side plate portion 122" of the succeeding second link side plate 120"; and, the first flexional position restricting surface 126a" of the front side plate portion 121" of the succeeding second link side plate 120" comes closer to a second flexional position restricting surface (126b) of a front side plate portion (121) of another succeeding second link side plate (120).

At this point, because the arc center O1 of the arc-shaped rear flexion outer circumferential end surface 122a is provided so as to longitudinally precede the longitudinal center M1 of the linkage portion 123" of the succeeding second link side plate 120" as described above, the arc center O1 of the arc-shaped rear flexion outer circumferential end surface 122a moves upward to the flexion inner circumferential side (or moves in a direction opposite to the support 150) to create the gap S2 between the rear flexion outer circumferential end surface 122a of the second link side plate 120 and the support surface 151 of the support 150 as soon as the link side plate 120 is flexed.

Furthermore, the flexion outer circumferential-side surface 132 of the flexion outer circumferential-side connecting arm 130 is provided so as to be closer to the cable flexion inner circumferential side than the flexion outer circumferential edge 112c (122c) of the rear side plate portion 112 (122), as described above.

This arrangement enables to create the gap 51 between the flexion outer circumferential-side connecting arm 130 and the support surface 151 of the support 150 when the cable protection and guide device 100 moves from the linear position to the flexional position to prevent the flexion outer circumferential-side connecting arm 130 from sliding on the support surface 151.

As shown in FIGS. 9A and 9B, as the cable movable end E1 further moves from the state shown in FIGS. 8A and 8B, the cable protection and guide device 100 will be further flexed at the front side thereof in the cable longitudinal direction.

Specifically, as the linkage portion 123" of the succeeding second link side plate 120" connected to the second link side plate 120 is further bent:

the first linear position holding surface 125a of the rear side plate portion 122 of the second link side plate 120 further moves away from the second linear position holding surface 125b" of the rear side plate portion 122" of the succeeding second link side plate 120"; and, the first flexional position restricting surface 126a" of the front side plate portion 121" of the succeeding second link side plate 120" comes in contact with the second flexional position restricting surface (126b) of the front side plate portion (121) of the succeeding second link side plate (120).

At this point, the second link side plate 120 is further flexed and the arc center O1 of the arc-shaped rear flexion outer circumferential end surface 122a further moves upward to the flexion inner circumferential side, i.e., in the direction opposite to the support 150, to increase the gap S2 that was created between the rear flexion outer circumferential end surface 122a of the second link side plate 120 and the support surface 151 of the support 150.

In other words, the rear flexion outer circumferential end surface 122a of the rear side plate portion 122 does not slide on the support surface 151 of the support 150.

The flexion outer circumferential-side connecting arm 130 does not also slide on the support surface 151.

Also, as described above, each of the flexion outer circumferential-side connecting arms 130 is provided at the position corresponding to the middle position between the two linkage portions 113 (123) of the link frame bodies mutually adjacent in the cable longitudinal direction. The flexion inner circumferential-side surfaces 133 of the flexion outer circumferential-side connecting arms 130 of the link frame bodies are coplanar with each other in the linear position (see FIGS. 5A and 5B).

With this configuration, as shown in FIG. 10A:

the flexion inner circumferential-side surface 133 of each flexion outer circumferential-side connecting arm 130 faces the center of the flexion of the cable protection and guide device 100 in the flexional position; and, cable C accommodated at the interior of the link frame bodies is put evenly on the flexion inner circumferential-side surfaces 133 of the flexion outer circumferential-side connecting arms 130.

In other words, in the prior art shown in FIG. 10B, because each of the flexion outer circumferential-side connecting arms 520 is provided at a position misaligned with a middle position between linkage portions 513 of the link frame bodies mutually adjacent in the cable longitudinal direction:

the flexion inner circumferential-side surfaces 522 of the flexion outer circumferential-side connecting arms 520 of the mutually adjacent link frame bodies respectively face in a direction which is misaligned with the center of the flexion of the cable protection and guide device 500 in the flexional position; and, the cable C accommodated at the interior of the link frame bodies is put on each end portion of the flexion inner circumferential-side surface 522 of the flexion outer circumferential-side connecting arm 520.

The prior art shown in FIG. 10B does not permit even distribution of the cable C due to the misalignment of the connecting arms 520 with the center of the flexion of the cable protection and guide device 500.

On the other hand, in the present embodiment, the cable C is put evenly on the flexion inner circumferential-side surfaces 133 of the flexion outer circumferential-side connecting arms 130. Thus, it is possible to prevent uneven abrasion to increase protection of the cable C in comparison with the prior art.

Similarly, as described above, each of the flexion inner circumferential-side connecting arms 140 is provided at the position corresponding to the middle position between the two linkage portions 113 (123) of the link frame bodies mutually adjacent in the cable longitudinal direction. The flexion outer circumferential-side surfaces 142 of the flexion outer circumferential-side connecting arms 140 of the link frame bodies are coplanar with each other in the linear position.

With this configuration, as shown in FIG. 10A, no difference in level is created between the flexion inner circumferential-side connecting arms 140 of the mutually adjacent link frame bodies when the cable protection and guide device 100 moves to the flexional position, and the cable C accommodated at the interior of the link frame bodies is put evenly on the flexion outer circumferential-side surfaces 142 of the flexion inner circumferential-side connecting arms 140.

In other words, in the prior art shown in FIG. 10B, because each of the flexion inner circumferential-side connecting arms 530 is provided at a position misaligned with a middle position between the linkage portions 513 of the link frame bodies mutually adjacent in the cable longitudinal direction:

a difference in level is created between the flexion inner circumferential-side connecting arms 530 of the mutually adjacent link frame bodies when the device 100 moves to the flexional position; and, the cable C accommodated at the interior of the link frame bodies is put on an end portion of the flexion outer circumferential-side surface 531 of the flexion inner circumferential-side connecting arm 530.

On the other hand, in the present embodiment, the cable C is put evenly on the flexion outer circumferential-side surfaces 142 of the flexion inner circumferential-side connecting arms 140. Thus, it is possible to prevent uneven abrasion to increase protection of the cable C in comparison with the prior art.

Also, when the cable protection and guide device 100 moves back from the flexional position shown in FIGS. 9A and 9B to the linear position shown in FIG. 7, the gap S2 exists between the rear flexion outer circumferential end surface 122a of the rear side plate portion 122 of the link side plate 120 and the support surface 151 of the support 150 until the linkage portion 123" of the succeeding link side plate 120" is unbent and the rear side plate portion 122 of the link side plate 120 rotationally moves about the substantial center of the linkage portion 123" of the succeeding link side plate 120" to come in contact with the support surface 151 of the support 150.

In other words, the rear flexion outer circumferential end surface 122a of the rear side plate 122 does not slide on the support surface 151 of the support 150 when the cable protection and guide device 100 moves back from the flexional position to the linear position as well.

Also, the flexion outer circumferential-side connecting arm 130 does not slide on the support surface 151.

If there is a guide member (not shown) on a side of the cable movable end E1 for guiding the cable protection and guide device 100 in the linear position, the gap S2 is created between the guide member and the front flexion outer circumferential end surface 122b of the rear side plate portion 122 of the second link side plate 120 when the cable protection and guide device 100 moves from the linear position to the flexional position on the side of the cable movable end E1.

In other words, the same effect can be achieved between the front flexion outer circumferential end surface 122b of the rear side plate portion 122 and the guide member as between the rear flexion outer circumferential end surface 122a of the rear side plate portion 122 and the support surface 151 of the support 150.

Also, the gap S1 is created between the flexion outer circumferential-side connecting arm 130 and the guide member.

In other words, the same effect can be achieved between the flexion outer circumferential-side connecting arm 130 and the guide member as between the flexion outer circumferential-side connecting arm 130 and the support surface 151 of the support 150.

With the thus obtained cable protection and guide device 100, because each of the first link side plates 110 (second link side plate) integrally includes the front side plate portion 111 (121) connected to the preceding first link side plate 110' (second link side plate 120') in the cable longitudinal direction to form the cable flexion inner circumferential side:

the rear side plate portion 112 (122) is connected to the succeeding first link side plate 110" (second link side plate 120") in the cable longitudinal direction to form the cable flexion outer circumferential side;

the flexible linkage portion 113 (123) is interposed between the front side plate portion 111 (121) and the rear side plate portion 112 (122);

each of the flexion outer circumferential-side connecting arms 130 is detachably mounted to the first and second link side plates 110 and 120; and, the flexion outer circumferential-side surface 132 of the flexion outer circumferential-side connecting arm 130 is provided so as to be closer to the cable flexion inner circumferential side than the flexion outer circumferential edge 112c (122c) of the rear side plate portion 112 (122).

It is thus possible to prevent noise otherwise generated by the flexion outer circumferential-side connecting arm when the device 100 moves from the flexional position to the linear position, to prevent the flexion outer circumferential-side connecting arm 130 from being abraded to prevent generation of abrasion powder of the flexion outer circumferential-side connecting arm 130, to mitigate impact load and reduce resonance and impact force transmitted to the cable protection and guide device 100, and, to prevent disconnection of the flexion outer circumferential-side connecting arm 130.

Also, because each of the flexion outer circumferential-side connecting arms 130 is provided at the position corresponding to the middle position between the two linkage portions 113 (123) of the link frame bodies mutually adjacent in the cable longitudinal direction, and the flexion inner circumferential-side surfaces 133 of the flexion outer circumferential-side connecting arms 130 of the link frame bodies are coplanar with each other in the linear position, it is possible to prevent uneven abrasion to increase protection of the cable C.

Similarly, because each of the flexion inner circumferential-side connecting arms 140 is provided at the position corresponding to the middle position between the two linkage portions 113 (123) of the link frame bodies mutually adjacent in the cable longitudinal direction, and the flexion outer circumferential-side surfaces 142 of the flexion inner circumferential-side connecting arms 140 of the link frame bodies are coplanar with each other in the linear position, it is possible to prevent uneven abrasion to increase protection of the cable C.

Each of the second link side plates 120 (first link side plates) is arranged longitudinally such that the front and rear parts thereof respectively face the side of the cable movable end E1 and the side of the cable fixed end E2. Each of the rear side plate portion 122 of the second link side plates 120 (first link side plates) has the rear flexion outer circumferential end surface 122a which is in an arc shape and provided on the cable flexion outer circumference side at the portion corresponding to the linkage portion 123" of the succeeding second link side plate 120" (first link side plate). The arc center O1 of the rear flexion outer circumferential end surface 122a of the second link side plate 120 (first link side plate) is provided so as to longitudinally precede the longitudinal center M1 of the linkage portion 123" of the succeeding second links side plate 120" (first link side plate). Accordingly, it is possible to prevent the rear flexion outer circumferential end surface 122a of the rear side plate portion 122 from sliding on the support surface 151 of the support 150 to prevent generation of abrasion powder, and to prevent noise that is otherwise generated when the rear flexion outer circumferential end surface 122a of the rear side plate portion 120 slides on the support surface 151 of the support 150.

The first and second link side plates 110 and 120, respectively, include the hinge shafts 117 and 127 as the link-side hinge portion. The link-side hinge portion has the link-side circumferential surface 127a surrounding in the circumferential direction the rotating axis line extending along the cable longitudinal direction. The flexion outer circumferential-side connecting arm 130 includes the hooks 131 as the arm-side hinge portions. The arm-side hinge portions have the arm-side circumferential surface 131a surrounding the rotating axis line in the circumferential direction and confronting the link-side circumferential surface 127a in the radial direction centered on the rotating axis line for the rotation range of the flexion outer circumferential-side connecting arm 130. The hinge shafts 117, 127 and the hooks 131, 131 constitute the hinge structure which includes the anti-disconnect portion A11 for preventing the arm disconnect phenomenon in which the hooks 131, 131 are disconnected from the hinge shafts 117, 127 by external forces from the cable C to the flexion outer circumferential-side connecting arm 130. The anti-disconnect portion A11 includes:

the link side engaging element 127b as the link-side anti-disconnect engaging portion provided on the link-side circumferential surface 127a; and, the arm-side engaging element 131b as the arm-side anti-disconnect engaging portion provided on the arm-side circumferential surface 131a.

The arm-side engaging element 131b and the link side engaging element 127b engage to prevent the arm disconnect phenomenon when the flexion outer circumferential-side connecting arm 130 is connected to the first and second link side plates 110 and 120. Thus, it is possible to reliably prevent accidental disconnection of the flexion outer circumferential-side connecting arm 130 when switching between the linear position and the flexional position.

What is claimed is:

1. A cable protection and guide device having a number of link frame bodies connected to each other in a cable longitudinal direction between a cable movable end and a cable fixed end, comprising:

each of said link frame bodies includes an interior, said cable residing in said interior of said number of number of link frame bodies;

each of said link frame bodies taking a linear position in which said device is in contact with a support surface of a support and a flexional position in which said device is spaced from said support surface;

each of said link frame bodies includes: a pair of laterally spaced apart link side plates;

said link side plates form a flexional circumferential bend having a flexional inner circumferential side and a flexional outer circumferential side; each of said pair of spaced apart link side plates integrally includes: a front side plate portion connected to a preceding link side plate in said cable longitudinal direction to form a flexional inner circumferential side, a rear side plate portion connected to a succeeding link side plate in said cable longitudinal direction to form a flexional outer circumferential side, and, a flexible linkage portion interposed between said front side plate portion and said rear side plate portion;

said flexional outer circumferential side of each of said link plates includes an edge;

a flexional outer circumferential side connecting arm bridging each of said flexional outer circumferential sides of each of said link side plates;

each of said flexional outer circumferential side connecting arms is detachably mounted to said link side plates, each of said flexional outer circumferential side connecting arms includes a flexional outer circumferential side surface;

each of said flexional outer circumferential side connecting arms bridging said flexional outer circumferential sides of each of said link side plates being spaced inwardly with respect to said edges of said flexional outer circumferential sides of each of said link side plates such that said flexional outer circumferential side surfaces of said flexional outer circumferential connecting arms do not engage said support surface of said support in said linear position of said link frame bodies;

a flexional inner circumferential side connecting arm bridging each of said flexional inner circumferential sides of each of said link side plates;

each of said flexional outer circumferential side connecting arms is provided at a position corresponding to a middle position between said flexible linkage portions of said mutually adjacent link frame bodies in said cable longitudinal direction; and, said flexional outer circumferential side connecting arms include flexional inner circumferential side surfaces, said flexional inner circumferential side surfaces of said flexional outer circumferential side connecting arms of said link frame bodies are coplanar with each other in said linear position of said link frame bodies.

2. The cable protection and guide device according to claim 1, wherein:

each of said flexional inner circumferential side connecting arms is provided at a position corresponding to a middle position between said flexible linkage portions of said mutually adjacent link frame bodies in said cable longitudinal direction; and, said flexional inner circumferential side connecting arms include flexional outer circumferential side surfaces, said flexional outer circumferential-side surfaces of said flexional outer circumferential side connecting arms of said link frame bodies are coplanar with each other in said linear position.

3. A cable protection and guide device having a number of link frame bodies connected to each other in a cable longitudinal direction between a cable movable end and a cable fixed end, comprising:

each of said link frame bodies includes an interior, said cable residing in said interior of said number of number of link frame bodies;

each of said link frame bodies taking a linear position in which said device is in contact with a support surface of a support and a flexional position in which said device is spaced from said support surface;

each of said link frame bodies includes: a pair of laterally spaced apart link side plates;

said link side plates form a flexional circumferential bend having a flexional inner circumferential side and a flexional outer circumferential side; each of said pair of spaced apart link side plates integrally includes: a front side plate portion connected to a preceding link side plate in said cable longitudinal direction to form a flexional inner circumferential side, a rear side plate portion connected to a succeeding link side plate in said cable longitudinal direction to form a flexional outer circumferential side, and, a flexible linkage portion interposed between said front side plate portion and said rear side plate portion;

said flexional outer circumferential side of each of said link plates includes an edge;

a flexional outer circumferential side connecting arm bridging each of said flexional outer circumferential sides of each of said link side plates;

each of said flexional outer circumferential side connecting arms is detachably mounted to said link side plates, each of said flexional outer circumferential side connecting arms includes a flexional outer circumferential side surface;

each of said flexional outer circumferential side connecting arms bridging said flexional outer circumferential sides of each of said link side plates being spaced inwardly with respect to said edges of said flexional outer circumferential sides of each of said link side plates such that said flexional outer circumferential side surfaces of said flexional outer circumferential connecting arms do not engage said support surface of said support in said linear position of said link frame bodies;

a flexional inner circumferential side connecting arm bridging each of said flexional inner circumferential sides of each of said link side plates;

each of said link side plates is arranged longitudinally such that front and rear parts thereof face a side of said cable movable end and a side of said cable fixed end, respectively;

each of said rear side plate portions of said link side plates has a rear flexional outer circumferential end surface which is in an arc shape and is provided on said cable flexional outer circumference side at a position corresponding to said linkage portion of a succeeding link side plate; and, an arc center of said rear flexional outer circumferential end surface of said link side plate is provided so as to longitudinally precede a longitudinal center of said linkage portion of said succeeding link side plate.

4. A cable protection and guide device having a number of link frame bodies connected to each other in a cable longitudinal direction between a cable movable end and a cable fixed end, comprising:

each of said link frame bodies includes an interior, said cable residing in said interior of said number of number of link frame bodies;

each of said link frame bodies taking a linear position in which said device is in contact with a support surface of a support and a flexional position in which said device is spaced from said support surface;

each of said link frame bodies includes: a pair of laterally spaced apart link side plates;

said link side plates form a flexional circumferential bend having a flexional inner circumferential side and a flexional outer circumferential side; each of said pair of spaced apart link side plates integrally includes: a front side plate portion connected to a preceding link side plate in said cable longitudinal direction to form a flexional inner circumferential side, a rear side plate portion connected to a succeeding link side plate in said cable longitudinal direction to form a flexional outer circumferential side, and, a flexible linkage portion interposed between said front side plate portion and said rear side plate portion;

said flexional outer circumferential side of each of said link plates includes an edge;

a flexional outer circumferential side connecting arm bridging each of said flexional outer circumferential sides of each of said link side plates;

each of said flexional outer circumferential side connecting arms is detachably mounted to said link side plates, each of said flexional outer circumferential side connecting arms includes a flexional outer circumferential side surface;

each of said flexional outer circumferential side connecting arms bridging said flexional outer circumferential sides of each of said link side plates being spaced inwardly with respect to said edges of said flexional outer circumferential sides of each of said link side plates such that said flexional outer circumferential side surfaces of said flexional outer circumferential connecting arms do not engage said support surface of said support in said linear position of said link frame bodies;

a flexional inner circumferential side connecting arm bridging each of said flexional inner circumferential sides of each of said link side plates;

each of said link side plates comprises a link side hinge portion which has a link side circumferential surface surrounding, in a circumferential direction, a rotating axis line extending along said cable longitudinal direction;

each of said flexional outer circumferential side connecting arms comprising an arm side hinge portion which has an arm side circumferential surface surrounding said rotating axis line in said circumferential direction and confronting said link side circumferential surface in a radial direction centered on said rotating axis line for a rotation range of said flexional outer circumferential side connecting arm;

each of said link side hinge portions and each of said arm side hinge portions comprising a hinge structure which includes an anti-disconnect portion for preventing an arm disconnection in which said arm side hinge portion is disconnected from said link side hinge portion by external force acting from said cable upon said flexional outer circumferential side connecting arm;

each of said anti-disconnect portions comprising a link side anti-disconnect engaging portion provided on said link side circumferential surface and an arm-side anti-disconnect engaging portion provided on said arm side circumferential surface; and, said arm-side anti-disconnect engaging portion and said link side anti-disconnect engaging portion engaging to prevent said arm disconnection.

* * * * *

UNITED STATES PATENT AND TRADEMARK OFFICE
CERTIFICATE OF CORRECTION

PATENT NO. : 8,707,670 B2
APPLICATION NO. : 13/765608
DATED : April 29, 2014
INVENTOR(S) : Komiya It is certified that error appears in the above-identified patent and that said Letters Patent is hereby corrected as shown below:

In the Specification

Col. 14, line 64, after "gap" delete "51" and insert -- S1 -- therefor.

Signed and Sealed this
Fifteenth Day of July, 2014

Michelle K. Lee
*Deputy Director of the United States Patent and Trademark Office*